(12) United States Patent
Inuma (10) Patent No.: US 8,119,060 B2
(45) Date of Patent: Feb. 21, 2012

(54) SOLDER RECOVERY DEVICE

(75) Inventor: Takehiro Inuma, Hadano (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/691,311

(22) Filed: Jan. 21, 2010

(65) Prior Publication Data
US 2010/0187732 A1 Jul. 29, 2010

(30) Foreign Application Priority Data
Jan. 23, 2009 (JP) ................................ 2009-012748

(51) Int. Cl.
*C21B 3/04* (2006.01)

(52) U.S. Cl. .......................... 266/227; 266/205; 75/672

(58) Field of Classification Search .................. 266/205, 266/275, 277, 227; 75/672
See application file for complete search history.

(56) References Cited

U.S. PATENT DOCUMENTS

| | | | | |
|---|---|---|---|---|
| 3,923,499 A * | 12/1975 | Manthey et al. | ................ | 75/698 |
| 4,191,559 A * | 3/1980 | Van Linden et al. | ......... | 75/10.39 |
| 6,464,929 B1 * | 10/2002 | Groteke | ........................ | 266/205 |
| 6,555,050 B1 * | 4/2003 | Groteke et al. | ................. | 266/78 |
| 6,767,382 B2 * | 7/2004 | Stratigos et al. | ................ | 75/375 |
| 6,942,791 B1 * | 9/2005 | Petrov et al. | .................. | 210/175 |
| 6,948,650 B2 * | 9/2005 | Howell et al. | ................. | 228/260 |
| 2007/0017959 A1 | 1/2007 | Nakagawa et al. | | |

FOREIGN PATENT DOCUMENTS

| JP | 2004-311620 | * 11/2004 |
|---|---|---|
| JP | 3733362 | 10/2005 |
| JP | 2005-344204 | 12/2005 |
| JP | 2007-33048 | 2/2007 |

* cited by examiner

*Primary Examiner* — Scott Kastler
*Assistant Examiner* — Michael Aboagye
(74) *Attorney, Agent, or Firm* — Cooper & Dunham LLP (57) ABSTRACT

A solder recovery device includes a melter which melts solder dross stored in a melting crucible, an agitation unit which agitates the melted solder dross, so as to separate the melted solder dross up and down into an oxidized residue and a recycled solder in the melting crucible, and a suction unit which sucks the oxidized residue generated by the agitation, the suction unit sucking the oxidized residue in an upper portion of the melting crucible to be removed.

17 Claims, 7 Drawing Sheets

VIEW-A

VIEW-B

SOLDER RECOVERY DEVICE

PRIORITY CLAIM

The present application is based on and claims priority from Japanese Patent Application No. 2009-012748, filed on Jan. 23, 2009, the disclosure of which is hereby incorporated by reference in its entirety.

BACKGROUND

1. Technical Field

This disclosure relates to a solder recovery device which recovers a recycled solder from solder dross.

2. Description of the Related Art

When a flow soldering process is carried out, a solder comes into contact with oxygen, and thus, solder dross is inevitably generated. The generation of solder dross is higher in a Sn—Ag—Cu alloy, which is a mainstream Pb-free solder, than in a Sn—Pb solder, which has been widely used in recent years.

The solder dross contains a usable recycled solder, and oxidized residue, which should be disposed. A technique which recycles such solder dross as a usable recycled solder is known. However, with a conventional method of removing oxidized residue from solder dross, the oxidized residue can not be completely removed, and the oxidized residue which should be disposed still contains the recycled solder.

A common conventional method of recovering a solder involves separating solder dross up and down into a recycled solder and oxidized residue by heating the solder dross and agitating the heated solder dross, and then collecting the recycled solder after an operator has removed the upper oxidized residue with a ladle.

However, this solder recovering method not only removes the oxidized residue but also collects the recycled solder when removing the oxidized residue. Therefore, there is a problem in that the amount of residual solder in the oxidized residue is large.

There is also a problem in that the operation efficiency is deteriorated because it is necessary to carefully conduct a recovering operation such that the recycled solder does not mix with the oxidized residue. In addition, there is a problem in that effects on the body are a concern from a safety standpoint because the operation for removing the oxidized residue with a ladle is an operation in dusty environment.

Consequently, as described in JP3733362B, JP2005-344204A and JP2004-311620A, a method of effectively recovering a recycled solder without being mixed with oxidized residue is proposed.

For example, in the device described in JP3733362B, after melting solder dross in a melting crucible, the melted solder dross is first-screened for the purpose of improving the solder recovery rate. When the solder dross is first-screened, the recycled solder is coagulated into droplet form or is linearly coagulated, and the oxidized residue is cooled down to a powdery state. The recycled solder obtained by the first screening is second-screened, such that the powdery oxidized residue is removed from the recycled solder.

In the device described in JP2005-344204A, the solder dross is separated into the recycled solder and the oxidized residue by hydrovolcanic-exploding the solder dross. After the separation, the recycled solder and the oxidized residue are centrifuged, and the recycled solder is recovered in a particle state.

In the device described in JP2004-311620A, solder dross is agitated in a semispherical melting crucible, and is separated into a recycled solder and oxidized residue. After the separation, the recycled solder is flowed into an ingot provided in the lowest portion of the semispherical melting crucible from the bottom portion of the semispherical melting crucible.

However, in the device described in JP3733362B, the solder which is downsized in a droplet-like form by the first screening may pass through the second screening. Moreover, the small droplet-like solder may be destroyed.

Furthermore, after the first screening, the powdery oxidized residue may remain inside a solder, and the recycled solder may be coagulated in that state. When the coagulated recycled solder is second-screened, the oxidized residue which is adhered around the recycled solder can be removed, but the oxidized residue remaining inside the solder can not be removed.

In the device described in JP2005-344204A, when sucking up solder dross, the solder is coagulated while containing oxidized residue, and the oxidized residue on the surface may be removed, but the oxidized residue remaining inside the solder may not be removed.

If the device includes functions such as hydrovolcanic explosion and centrifugal separation, the device becomes complex, resulting in the increase in the costs. Even if the hydrovolcanic explosion is small, such hydrovolcanic explosion has a problem from a safety standpoint.

The device described in JP2004-311620A is suitable for recovering only a recycled solder, but the recycled solder may remain in the oxidized residue which should be disposed. When disposing the oxidized residue, the separated recycled solder may be mixed with the solder remaining in the oxidized residue, and the mixed solder may remain in the oxidized residue, so that the residual volume of the solder in the oxidized residue may not be reduced.

BRIEF SUMMARY

In an aspect of this disclosure, there is provided a solder recovery device which recovers a high-purity recycled solder and disposes only oxidized residue without containing a recycled solder when removing oxidized residue from solder dross, and also achieves improvements in operation efficiency and safety.

In another aspect, there is provided a solder recovery device including a melter which melts solder dross stored in a melting crucible, an agitation unit which agitates the melted solder dross, so as to separate the melted solder dross up and down into an oxidized residue and a recycled solder in the melting crucible, and a suction unit which sucks the oxidized residue generated by the agitation, the suction unit sucking the oxidized residue in an upper portion of the melting crucible to be removed.

Preferably, the above solder recovery device includes inside thereof a nitrogen atmosphere on heating and agitating.

Preferably, the agitation unit and the suction unit are replaceable relative to the melting crucible.

Preferably, the suction unit includes a structure which comes down toward an upper surface of the recycled solder, and a detection sensor which detects the upper surface of the recycled solder, and the suction unit is stopped at a predetermined position and starts a sucking operation when the detection sensor detects the upper surface of the recycled solder.

Preferably, the above solder recovery device includes a cooling unit which cools down the oxidized residue sucked by the suction unit.

Preferably, the suction unit is configured to generate air-blowing, and suck the oxidized residue while blowing up the oxidized residue.

Preferably, the suction unit is configured to generate air-blowing while moving parallel to an upper surface of the recycled solder, and suck the oxidized residue while blowing up the oxidized residue.

Preferably, the suction unit is configured to generate a spiral air current inside the melting crucible by air-blowing and sucking, and suck the oxidized residue while blowing up the oxidized residue.

Preferably, the suction unit includes an air-blowing section and a suction section facing each other, the suction unit being configured to suck the oxidized residue from the side direction of the melting crucible.

Preferably, the above solder recovery device includes inside thereof a nitrogen atmosphere when sucking the oxidized residue by the suction unit.

Preferably, the suction unit is configured to generate air-blowing by nitrogen gas, and suck the oxidized residue.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENT

Hereinafter, an embodiment of the present invention will be described with reference to the drawings.

Figure 1:
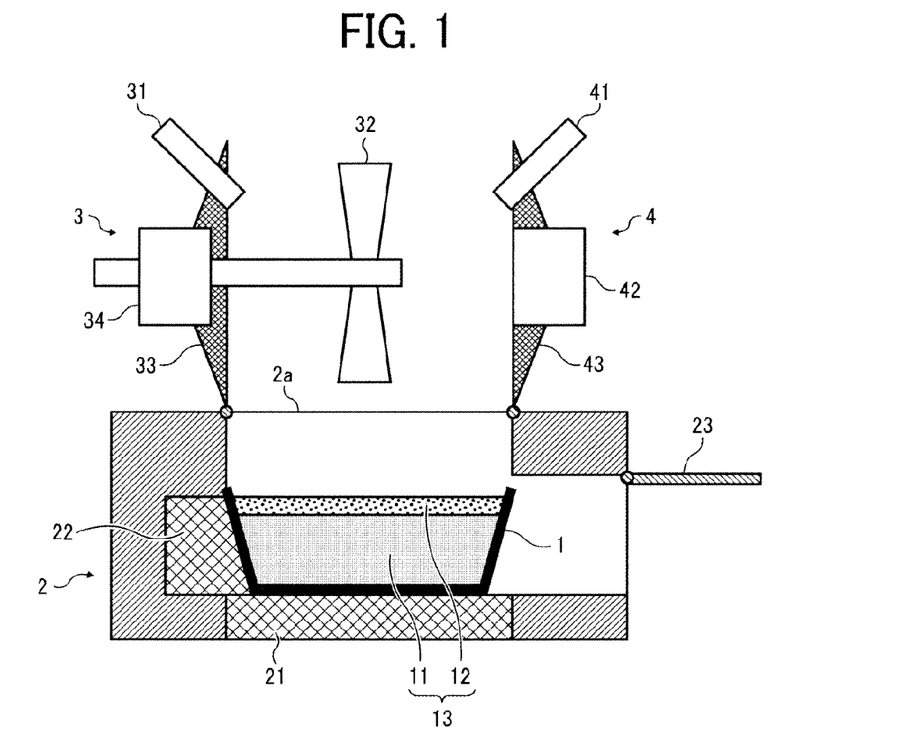
FIG. 1 is a sectional view illustrating a schematic structure of a solder recovery device according to an embodiment of the present invention.

FIG. 1 is a sectional view illustrating a schematic structure of a solder recovery device according to the embodiment of the present invention. The solder recovery device of this embodiment includes a solder storage tray 1 of a melting crucible, a melter 2 of a melting unit, an agitation unit 3, and a suction unit 4.

The solder storage tray 1 stores solder dross 13 in which a recycled solder 11 and oxidized residue 12 are mixed. The melter 2 has on the top portion thereof an opening portion 2a. The solder storage tray 1 has therearound a heating unit 21 and a cooling unit 22. A door member 23 is provided in a doorway for the solder storage tray 1 in a rotatable manner.

The agitation unit 3 includes a blower member 31 and a rotatable agitation blade 32. The agitation unit 3 retains the blower member 31 and the agitation blade 32. The agitation unit 3 also includes a lid member 33 which opens and closes the opening 2a of the melter 2. The lid member 33 is rotatably provided in one side wall portion of the melter 2. The lid member 33 includes a driving source 34 for rotating the agitation blade 32 such as a motor.

The suction unit 4 includes an air-blow section 41 and a suction section 42 such as a suction nozzle. The suction unit 4 retains the air-blow section 41 and the suction section 42. The suction unit 4 also includes a lid member 43 which opens and closes the opening 2a of the melter 2. The lid member 43 is rotatably provided in the other side wall portion of the melter 2.

Hereinafter, the operation of the present embodiment will be described.

The door member 23 is opened, and the solder storage tray 1 in which the solder dross 13 is stored is set in a setting position from the doorway of the melter 2. After setting the solder storage tray 1, the doorway is closed by the door member 23. Upon the starting of the melter 2, the heating unit 21 operates to start heating the solder storage tray 1.

Operations of each section described below are controlled by a control section such as a not shown CPU (Central Processing Unit).

The heating temperature is previously set. The heating unit 21 heats the solder dross 13 until the solder dross 13 reaches a set temperature. The suggested set temperature is, for example, 300° C.

When the solder dross 13 reaches the set temperature, the agitation unit 3 is activated while maintaining such a temperature, so as to start an agitation process. The agitation time in this agitation process is previously set.

Figure 2:
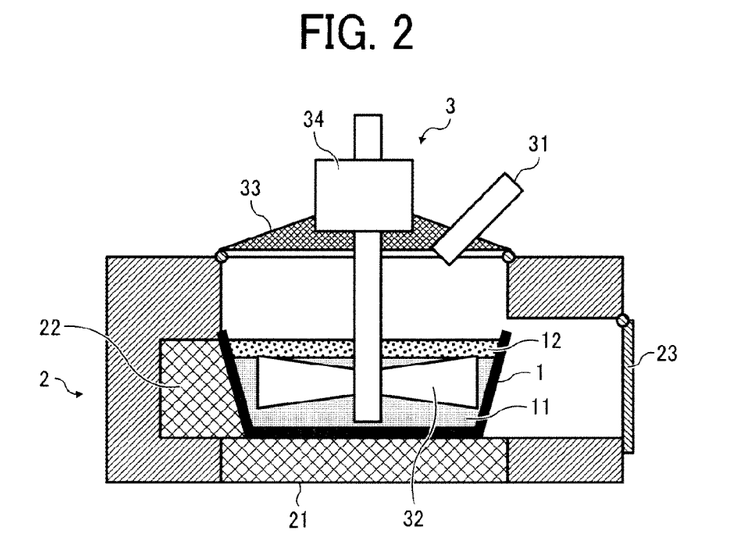
FIG. 2 is a sectional view illustrating an operation state of an agitation unit in the embodiment of the present invention.

FIG. 2 is a sectional view illustrating the operation state of the agitation unit in the embodiment of the present invention.

The opening 2a of the melter 2 is hermetically-sealed by rotating the lid member 33 of the agitation unit 3. In this state, the agitation blade 32 is put in the solder storage tray 1, and starts rotating.

By agitating the solder dross 13 with the agitation blade 32, the solder dross 13 which is a mixture of the recycled solder 11 and the oxidized residue 12 is gradually separated into the recycled solder 11 and the oxidized residue 12.

The oxygen level inside the device is lowered by blowing nitrogen from the blower member 31 while heating and agitating the solder dross. By lowering the oxygen density inside the device, the oxidization of the recycled solder 11 while heating and agitating, i.e., the generation of the excess oxidized residue 12 can be controlled.

After the set agitation time, the next suction process is conducted.

Figure 3:
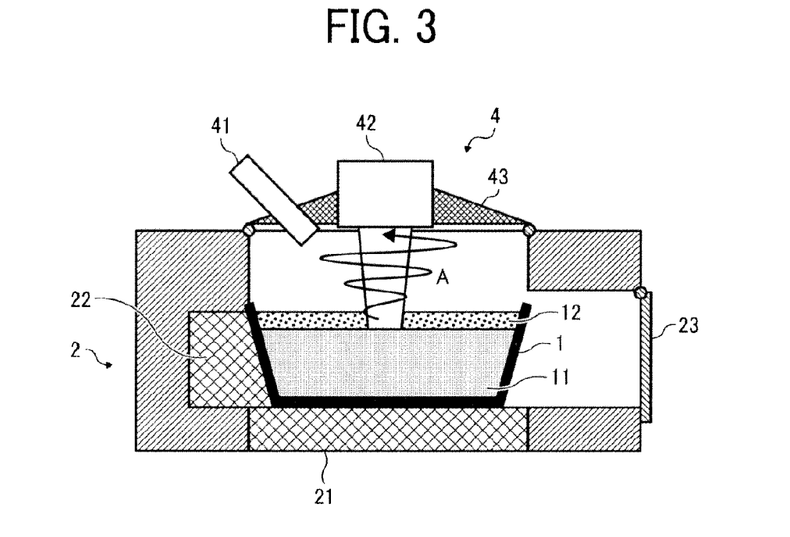
FIG. 3 is a sectional view illustrating an operation state of a suction unit in the embodiment of the present invention.

FIG. 3 is a sectional view illustrating the operation state of the suction unit in the embodiment of the present invention.

After the above-mentioned agitation time, the agitation unit 3 is placed back in the original position. Then, the opening 2a of the melter 2 is hermetically-sealed by rotating the suction unit 4.

In the standby state of the suction unit 4, air or nitrogen blows out from the air-blow member 41. The oxidized residue 12 in the separation state blows upward of the solder storage tray 1 in the melter 2. Spiral air flow A is generated inside the solder storage tray 1, and the oxidized residue 12 is sucked along this air flow A by the suction member 42 of the suction unit 4.

The suction unit 4 may have a structure which directly sucks by a suction nozzle without blowing air or a structure which sucks by blowing air according to a shape of a tray.

In addition, the oxidized residue 12 may spark when the oxidized residue 12 is in contact with air at high temperature. Especially, when sucking the oxidized residue 12 in advance, the oxidized residue 12 is blown out in the molten state of the remaining recycled solder, so that the oxidized residue 12 easily sparks at high temperature.

In order to further enhance the safety of the operation, it is necessary to prevent the oxidized residue from sparking. For this reason, the oxygen level of the oxidized residue generation area in the melter 2 is reduced by blowing nitrogen without blowing air, such that the oxidized residue is unlikely to spark. In the case that the oxidized residue sparks, the exhaust path of the oxidized residue in the suction unit 4 has a fire-resistant structure which does not catch fire. It is preferable for the suction unit 4 to have a cooling function which cools down the collected oxidized residue 12 for preventing such sparking.

Upon the activation of the cooling unit 22, the cooling unit 22 starts cooling the solder storage tray 1 in order to coagulate the recycled solder. In the case of cooling first, the cooling unit 22 starts cooling when the suction unit 4 reaches a standby state after the agitation. In the case of sucking first, the cooling unit 22 starts cooling after the oxidized residue 12 is removed by sucking.

When coagulating the recycled solder, it is preferable to put the after-mentioned divider in the solder storage tray 1 in the molten state in view of the recovery size of the recycled solder. The size of one recycled solder when recovering the recycled solder can be reduced by putting the divider in the solder storage tray 1.

Figure 4:
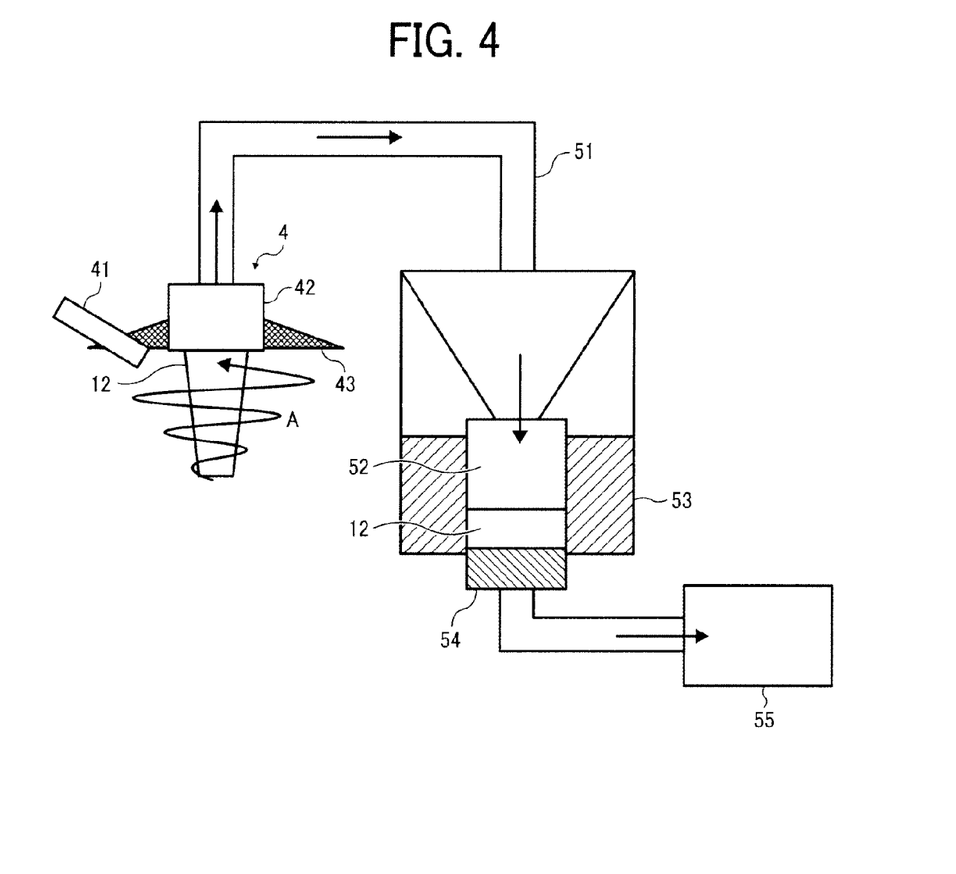
FIG. 4 is a configuration diagram illustrating an exhaust path of the suction unit in the embodiment of the present invention.

FIG. 4 is a configuration diagram illustrating the exhaust path of the suction unit in the embodiment of the present invention. Reference number 51 denotes an exhaust path including a pipe and the like. The exhaust path 51 includes an oxidized residue recovering section 52, a recovering section cooling unit 53, a protection filter 54, and a suction source 55 such as a suction fan.

The suction member 42 of the suction unit 4 is provided with the exhaust path 51 coupled to the suction source 55. The oxidized residue 12 sucked by the suction member 42 is collected to the oxidized residue recovering unit 52 via the exhaust path 51. The exhaust path 51 includes on an inside wall thereof a fire-resistant treatment on the assumption that the oxidized residue sparks.

The oxidized residue recovering unit 52 includes inside thereof the protection filter 54 which can catch the oxidized residue. The oxidized residue 12 sucked in the oxidized residue recovering section 52 accumulates in the protection filter 54. The oxidized residue recovering section 52 includes therearound the recovering section cooling unit 53 which cools down the recovered oxidized residue 12.

As described above, by cooling the oxidized residue 12 accumulated in the oxidized residue recovering section 52, the sparking of the oxidized residue 12 is prevented. The oxidized residue recovering section 52 includes a structure which can be easily detached. When a predetermined amount of oxidized residue 12 is accumulated in the oxidized residue recovering section 52, the accumulated oxidized residue 12 can be disposed by detaching the oxidized residue recovering section 52.

In this case, the oxidized residue 12 is caught by the protection filter 54 provided 12 between the oxidized residue recovering section 52 and the suction source 55, so that the oxidized residue 12 can be prevented from entering into the suction source 55.

In addition by coupling the downstream side path (not shown) of the suction source 55 to an exhaust installation in a plant or the like, unusual odor generated by recovering the oxidized residue 12 can be exhausted and discharged.

Next, a process of recovering a recycled solder in the present embodiment will be described with reference to the flow chart illustrated in FIG. 5 in accordance with the operations by an operator, the performances of the device and the condition of the solder dross.

At first, the operator sets the solder storage tray 1 having the solder dross 13 in the melter 2 (S1), and activates the melter 2. After activating the melter 2, the heating unit 21 starts heating the solder storage tray 1 (S2). By this heating, the solder dross 13 in the solder storage tray 1 melts.

At this time, the agitation unit 3 is installed in the position illustrated in FIG. 2. After melting the solder dross 13, the agitation blade 32 of the agitation unit 3 is actived, and agitates the solder dross 13 (S3). By this agitation, the solder dross 13 is separated into the recycled solder 11 and the oxidized residue 12. In this case, if the atmosphere inside the device is nitrogen, the oxidization of the recycled solder 11 can be prevented.

After separating the solder dross into the recycled solder 11 and the oxidized residue 12, the agitation unit 3 is replaced by the suction unit 4, such that the suction unit 4 is installed in the position illustrated in FIG. 3 (S.4). In this state, although the recycled solder 11 and the oxidized residue 12 are in a separated state, the oxidized residue just after the separation has a high temperature. For this reason, the oxidized residue may spark if the oxidized residue comes into contact with air.

Therefore, by cooling the recycled solder 11 and the oxidized residue 12 with the cooling unit 22, the safety of the operation can be improved (S.5). Since the divider is disposed in the solder storage tray 1 before the start of the cooling, the size of one solder can be reduced when recovering as the recycled solder by coagulating the recycled solder After cooling the recycled solder 11 with the cooling unit 22, such that the recycled solder 11 is coagulated, the oxidized residue 12 is sucked by the suction unit 4 (S6). In this embodiment, the operation which blows air to the oxidized residue 12 by the air-blow member 41, and the suction operation by the suction member are conducted. Thereby, the oxidized residue 12 can be removed from the recycled solder. More particularly, the oxidized residue 12 is in a light powdery state, which blows up only by breathing, for example, so that the oxidized residue 12 can be easily removed by sucking.

A method of directly sucking oxidized residue by the suction nozzle of the suction unit 4, or a method of sucking oxidized residue while blowing away the oxidized residue may be considered as a method of sucking oxidized residue, which is provided in the suction unit 4. The method of directly sucking oxidized residue sucks the oxidized residue by detecting the surface of the recycled solder. The method of sucking the oxidized residue while blowing away the oxidized residue includes a method of blowing away oxidized residue by scanning the surface of the solder with air-blowing, and a method of blowing away the oxidized residue by generating a spiral air flow (cyclone).

If the oxidized residue has contact with air at high temperature, the oxidized residue may spark. For this reason, the recovery section cooling unit 53 having a cooling function for oxidized residue is provided in the oxidized residue recovering section 52 disposed in the exhaust path 51 extending from the suction member 42 of the suction unit 4 as illustrated in FIG. 4. The exhaust path 51 has a fire-resistant structure which does not catch fire even if the oxidized residue sparks in the exhaust path 51. In order to further improve the safety of the operation, as described above, the atmosphere of the device is set to nitrogen from the agitation of the solder dross. Thereby, the sparking of the oxidized residue can be prevented.

The recycled solder is coagulated and recovered by the cooling unit 22 in a state such that it is stored in the solder storage tray 1. More particularly, after significantly removing the oxidized residue, the solder storage tray 1 is removed from the device. The solder storage tray 1 has on the circumferential wall thereof a material to which the solder does not adhere. Accordingly, the recycled solder can be easily recovered by turning over the tray 1.

Even if the oxidized residue adheres to the recovered recycled solder, the oxidized residue exists only on the border surface in the separation state, and is not present inside the recycled solder. Therefore, a high purity solder can be recovered by removing the oxidized residue which adheres to the surface of the recycled solder.

Figure 5:
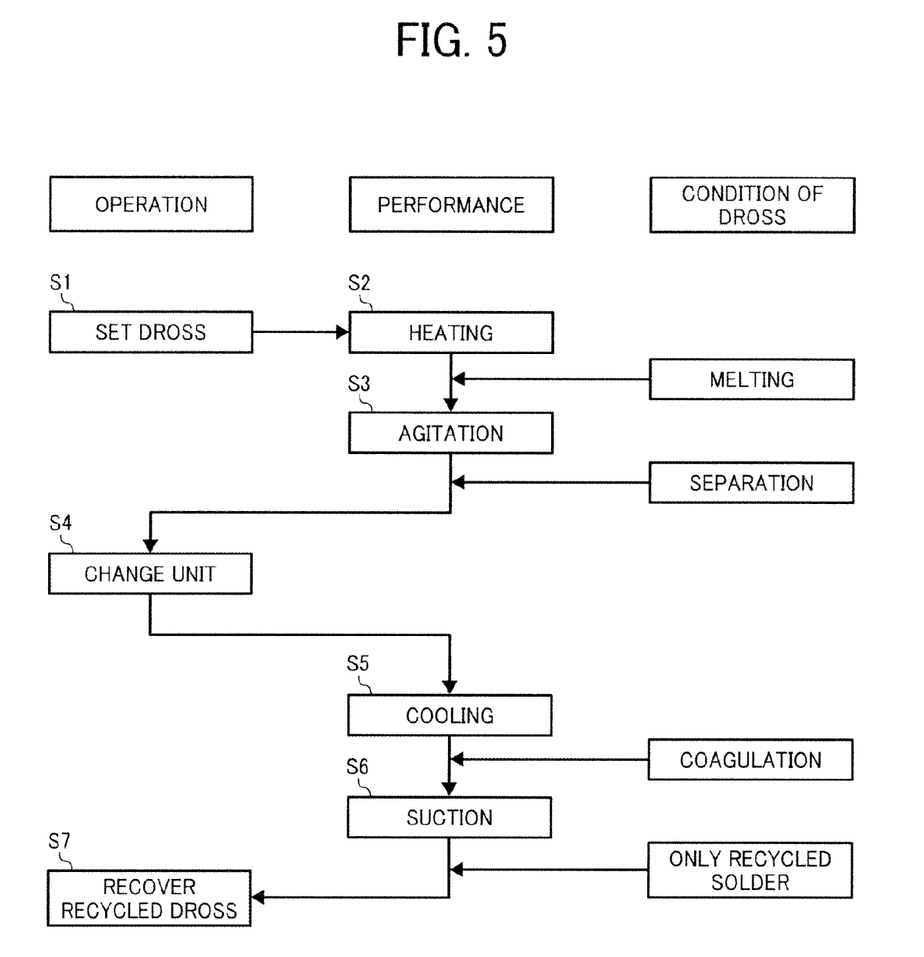
FIG. 5 is a flow chart regarding a process of recovering a recycled solder in the embodiment of the present invention.
Figure 6:
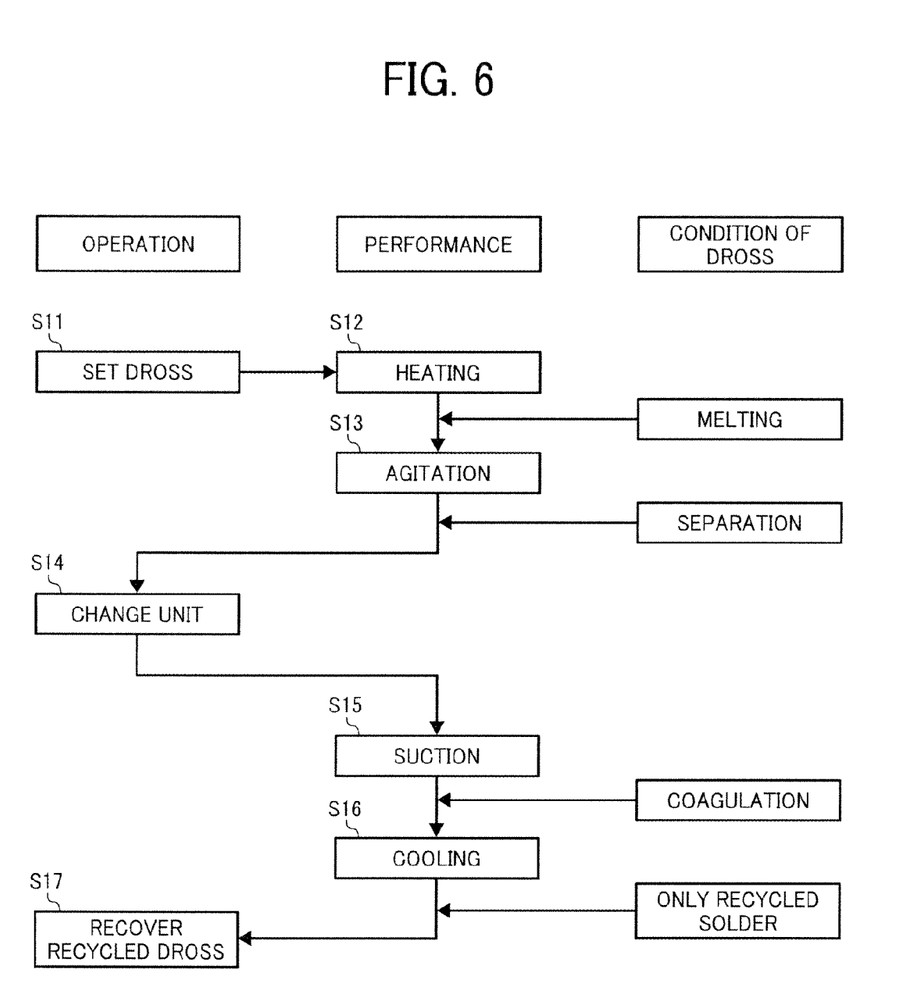
FIG. 6 is a flow chart illustrating a modified example of a process of recovering a recycled solder in the embodiment of the present invention.

FIG. 6 is a flow chart illustrating a modified example of a recovery process of a recycled solder in the embodiment of the present invention. In this example, different from the process flow illustrated in FIG. 5, the recycled solder is coagulated after sucking the oxidized residue.

The flow illustrated in FIG. 6 has Steps S11-S14 which are the same as the steps in the process flow illustrated in FIG. 5. However, in the flow illustrated in FIG. 6, the oxidized residue 12 is sucked (S15) after the agitation in the molten state of the recycled solder. More particularly, when the solder dross is separated into the recycled solder 11 and the oxidized residue 12, the oxidized residue 12 is sucked by the suction unit 4 in the molten state of the recycled solder 11.

By removing the oxidized residue 12 before the recycled solder 11 is coagulated, the amount of oxidized residue 12 which is contained in the recycled solder 11 when coagulating the recycled solder 11 can be minimized. The above-described method can be used for a method of sucking oxidized residue. However, when blowing away oxidized residue by air-blowing, the oxidized solder is blown away and sucked by using nitrogen without using oxygen, so that the oxidization of the recycled solder can be prevented.

After removing the oxidized solder 12 as described above, the recycled solder 11 is cooled down by the cooling unit 22. In this case, the size of the recycled solder can be adjusted by disposing the divider in the solder storage tray 1. The amount of oxidized residue which is contained in the recycled solder 11 when disposing the divider can be controlled because the oxidized residue 12 is removed before the recycled solder 11 is coagulated.

Figure 7:
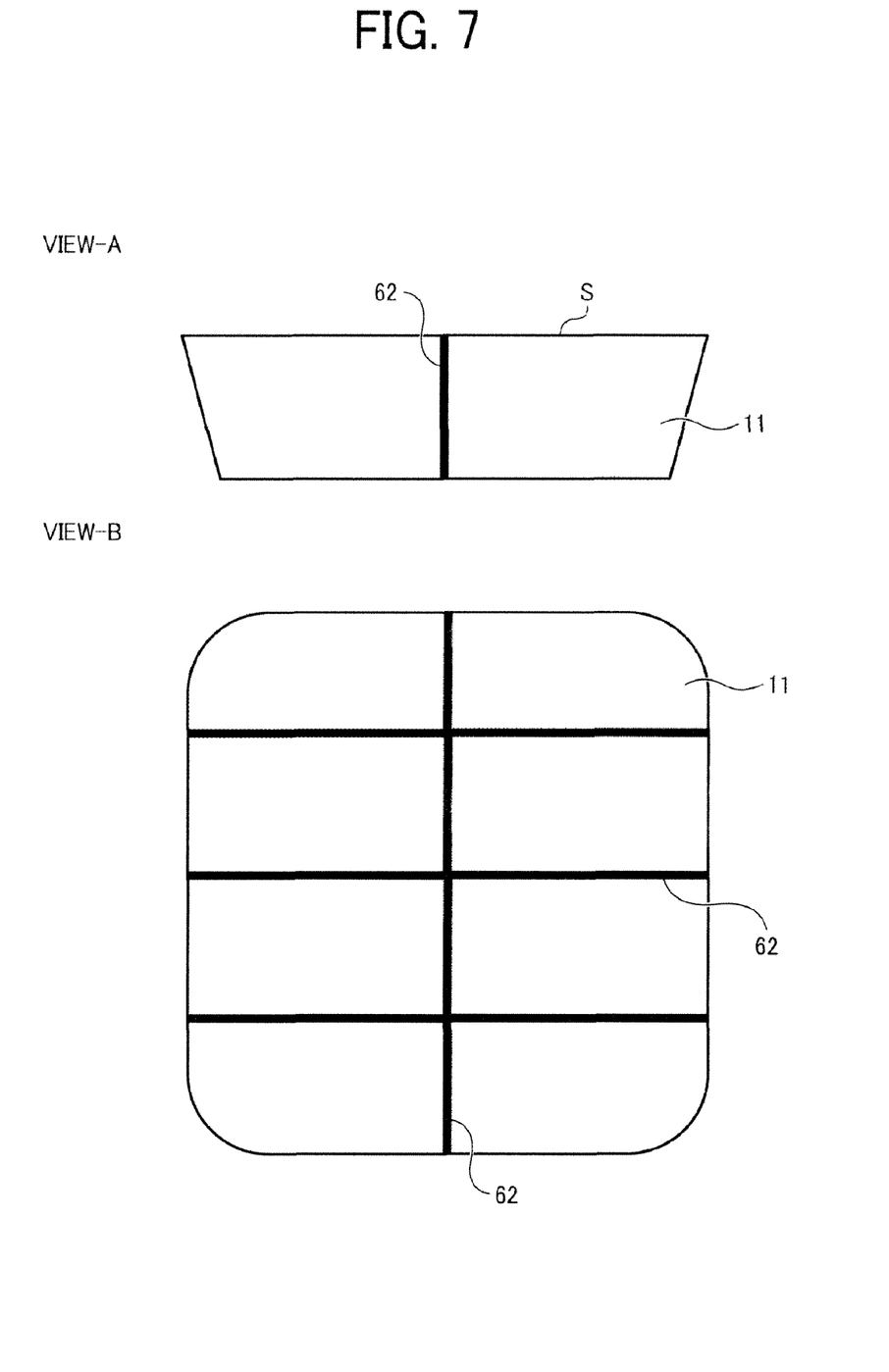
FIG. 7 is a view illustrating a recovered recycled solder in the embodiment of the present invention: VIEW-A is a side view and VIEW-B is a plan view.

FIG. 7 is a view illustrating the recovered recycled solder in the present embodiment; VIEW-A is a side view and VIEW-B is a plan view.

In VIEW-A and VIEW-B, reference number 62 denotes a divider which divides the recycled solder II. The size of the recycled solder 11 can be freely adjusted by putting the divider 61 in the recycled solder 11 before the recycled solder II is coagulated.

Accordingly, the recycled solder 11 can be recovered with a free size such as a small size. Since the recycled solder can be recovered having a small size, it is possible to throw in the recycled solder while adjusting its usage when using the recycled solder.

When recovering the recycled solder 11, the oxidized residue 12 may remain on a separation border S between the recycled solder 11 and the oxidized residue 12. When the oxidized residue 12 remains on the separation border S, the air-blowing is again conducted on the separation boarder S, or the separation border S is turned over to be slapped, for example, so that the oxidized residue 12 remaining on the separation border S can be removed.

Figure 8:
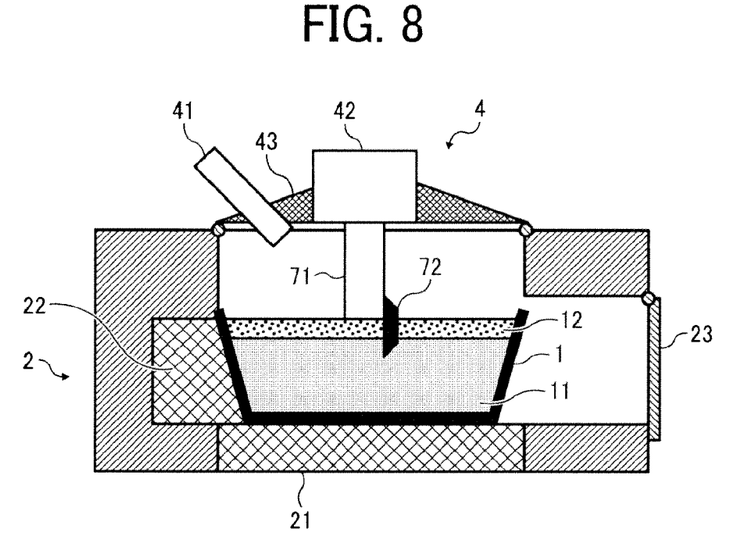
FIG. 8 is a sectional view illustrating a schematic structure of a modified example of a suction unit in the embodiment of the present invention.

FIG. 8 is a sectional view illustrating a schematic structure of a modified example of a suction unit in the present embodiment. In the following description, the same reference numbers are applied to members corresponding to the above-described members; thus, the detailed description thereof will be omitted.

In the structure illustrated in FIG. 8, the suction member 42 of the suction unit 4 is provided with an extendable suction nozzle 71 which sucks the oxidized residue 12 and a detection sensor 72 which detects the upper surface (solid face or liquid face) of the recycled solder 11. In this example, the detection sensor 72 is fastened to the leading end portion of the suction nozzle 71.

The suction nozzle 71 of the suction unit 4 is stopped at a previously set suction position relative to the upper surface of the solder according to the detection result of the detection sensor 72, and then the suction operation of the oxidized residue 12 by the suction nozzle 71 is started. Accordingly, the suction nozzle 71 can suck only the oxidized residue 12, so that recycled solder 11 can be prevented from being sucked.

Figure 9:
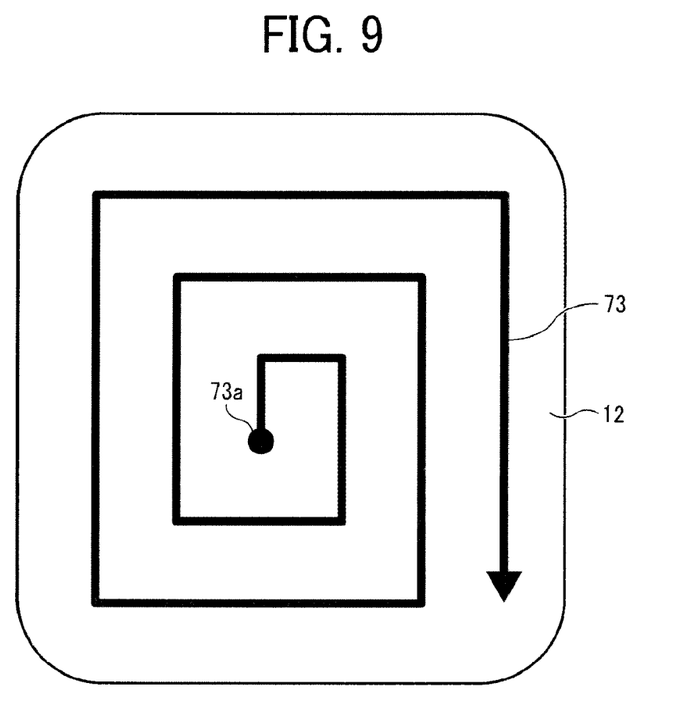
FIG. 9 is a view describing a movement locus of a suction nozzle in the embodiment of the present invention.

When sucking the oxidized residue 12, the suction nozzle 71 extends to the upper surface of the solid solder or the liquid solder, and the upper surface of the solder is detected by the detection sensor 72 provided in the leading end portion of the suction nozzle 71. If the suction nozzle 71 reaches the layer of the oxidized residue 12 according to the detection result, the suction nozzle 71 starts sucking the oxidized residue 12. Since the suction nozzle 71 sucks the oxidized residue 12 as much as possible, the suction nozzle 71 sucks the oxidized residue 12 while drawing a locus illustrated in FIG. 9. FIG. 9 is a plan view illustrating the solder storage tray 1. Reference number 73 denotes a movement locus of the suction nozzle 71 and reference number 73*a* denotes a starting point of the locus.

Figure 10:
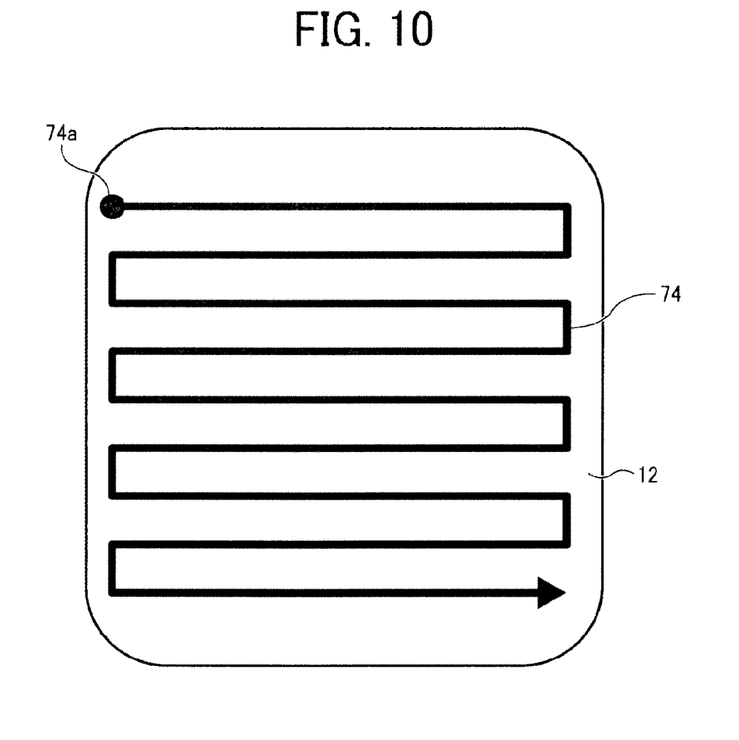
FIG. 10 is a view describing a movement locus of an air-blow member in the embodiment of the present invention.

When sucking the oxidized residue 12 by blowing up the oxidized residue 12 in order to remove the oxidized residue 12, as illustrated in FIG. 10, the air-blow member 41 is moved such that the entire area of the upper surface of the solder is scanned by the air-blowing of the air-blow member 41. The oxidized residue 12 is thereby effectively sucked. FIG. 10 is a plan view illustrating the solder storage tray 1. Reference number 74 denotes a movement locus of the air-blow member 41 and reference number 74*a* denotes a starting point of the movement locus (generation point of air-blowing) of the air-blow member 41.

Figure 11:
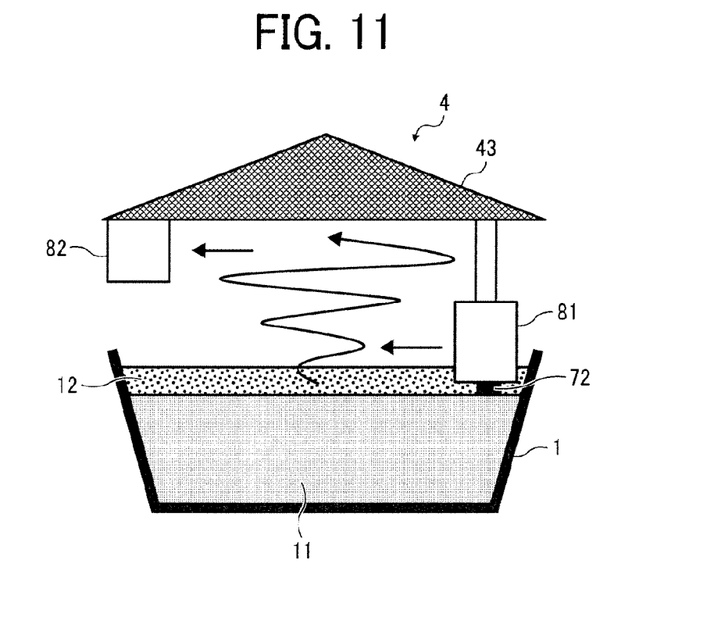
FIG. 11 is a sectional view illustrating a schematic structure of another modified example of a suction unit in the embodiment of the present invention.

FIG. 11 is a sectional view illustrating a schematic structure of another modified example of a suction unit in the embodiment of the present invention.

In the structure illustrated in FIG. 11, the suction unit 4 includes the lid member 43, an air-blowing member 81 and a suction member 82. The air-blowing member 81 is disposed under the lid member 43 in an up and down movable manner. The suction member 82 is provided in a diagonal position which is obliquely upward to the air-blowing member 81.

With the above-described structure, it is possible to blow air in the lateral direction relative to the powdery oxidized residue 12 separated from the recycled solder 11, and to suck the oxidized residue 12 by blowing up the oxidized residue 12.

More particularly, if the air-blowing member 81 is lowered near the upper surface of the solder, and the detection sensor 72 detects the upper surface of the solder, the air-blowing member 81 starts the air-blowing. The oxidized residue 12 near the upper surface of the solder can be thereby blown up inside the device. Therefore, the oxidized residue can be sucked by the spiral flow of the air-blowing with the suction member 82 disposed above the air-blowing member 81 in the lateral direction.

As described above, the air-blowing and the suction to the oxidized residue 12 are conducted over the entire area of the solder storage tray 1, so that the oxidized residue 12 can be effectively sucked and removed.

According to the embodiment of the present invention, a high quality recycled solder can be recovered by removing the oxidized residue from the solder dross generated in a soldering process. Moreover, since recycling of a reflow solder and the like is effectively and safely conducted, the present invention can be applied to a solder recycling process under various environments.

According to the embodiment of the present invention, the oxidized residue is removed from the solder dross, so that a high-grade recycled solder can be recovered. Moreover, only the oxidized residue can be disposed without containing a recycled solder, so that the residual volume of solder in the oxidized residue can be reduced. Furthermore, since the disposing amount is reduced, the disposing costs can be reduced; thus, economical effects can be improved.

In addition, the operation efficiency can be improved because the operation of removing the oxidized residue, which was conventionally conducted by an operator, is conducted by the device. Therefore, effects on body due to dust are reduced, so that the safety for an operator can be improved.

According to the embodiment of the present invention, by agitating the melted solder dross, the solder dross is separated into the recycled solder and the oxidized residue, and the oxidized residue exists only above the recycled solder. Therefore, a high-grade recycled solder can be obtained by removing the oxidized residue existing in the upper portion, and also only the oxidized residue can be disposed without containing the recycled solder in the oxidized residue.

According to the embodiment of the present invention, the oxidization of the recycled solder, namely, the generation of excess oxidized residue on heating and agitating can be controlled by lowering the oxygen level inside the device.

According to the embodiment of the present invention, the agitation process and the suction process are smoothly conducted.

According to the embodiment of the present invention, a problem in which a recycled solder is sucked in a melted state can be prevented.

According to the embodiment of the present invention, danger due to gas and the oxidized residue at a high temperature is reduced, so that the operation safety can be improved.

According to the embodiment of the present invention, the oxidized residue can be effectively sucked.

According to the embodiment of the present invention, the oxidized residue on the upper surface of the solder is all blown up, so that the oxidized residue can be effectively sucked.

According to the embodiment of the present invention, the oxidized residue is blown up in a spiral form, so that the oxidized residue can be further effectively sucked.

According to the embodiment of the present invention, the blowing and the sucking of the oxidized residue are conducted over the entire area of the melting crucible. Therefore, the oxidized residue can be effectively sucked.

According to the embodiment of the present invention, the oxygen level inside the solder recovery device is reduced; thus, sparking by the high-temperature oxidized residue can be prevented.

According to the embodiment of the present invention, the oxygen level and temperature inside the solder recovery device are lowered; thus, sparking by the high-temperature oxidized residue can be prevented.

Although the embodiments of the present invention have been described above, the present invention is not limited thereto. It should be appreciated that variations may be made in the embodiments described by persons skilled in the art without departing from the scope of the present invention.

What is claimed is:

1. A solder recovery device, comprising:
   a melter which melts solder dross stored in a melting crucible;
   an agitation unit which agitates the melted solder dross, so as to separate the melted solder dross up and down into an oxidized residue and a recycled solder in the melting crucible,
   said agitation unit including a first blower member configured to lower oxygen density in said solder recovery device by blowing a gas towards the melted solder dross while the agitation unit agitates the melted solder dross; and
   a suction unit which sucks the oxidized residue generated by the agitation, the suction unit sucking the oxidized residue in an upper portion of the melting crucible to be removed, wherein
   the first blower member has an exit orifice disposed to be above an upper surface of the melted solder dross and blows the gas in a generally downward direction towards the upper surface of the melted solder dross while the agitation unit agitates the melted solder dross, and
   the suction unit includes a second blower member that has an exit orifice disposed above an upper surface of the oxidized residue of the melted solder dross, the second blower member being configured to blow a gas in a generally downward direction towards the upper surface of the oxidized residue, such that the gas contacts the upper surface of the oxidized residue and thereby causes the oxidized residue to move towards the suction unit the suction unit further includes a lid member which opens and closes the opening of the melter.

2. The solder recovery device according to claim 1, wherein the first blower member blows nitrogen to generate a nitrogen atmosphere during heating and agitating.

3. The solder recovery device according to claim 1, wherein the agitation unit and the suction unit are replaceable relative to the melting crucible.

4. The solder recovery device according to claim 1, wherein
   the suction unit includes a structure which comes down toward an upper surface of the recycled solder, and a detection sensor which detects the upper surface of the recycled solder, and
   the suction unit is stopped at a predetermined position and starts a sucking operation when the detection sensor detects the upper surface of the recycled solder.

5. The solder recovery device according to claim 1, comprising a cooling unit which cools down the oxidized residue sucked by the suction unit.

6. The solder recovery device according to claim 1, wherein the suction unit is configured to generate a spiral air current inside the melting crucible by air-blowing from the second blower member, and suck the oxidized residue while blowing up the oxidized residue with the gas from the second blower member.

7. The solder recovery device according to claim 1, wherein the second blower member of the suction unit and a suction section of the suction unit face each other, the suction unit being configured to suck the oxidized residue from the side direction of the melting crucible.

8. The solder recovery device according to claim 1, wherein a gas source supplies nitrogen into the solder recovery device to generate a nitrogen atmosphere while the suction unit sucks the oxidized residue in the upper portion of the melting crucible.

9. The solder recovery device according to claim 1, wherein the second blower member of the suction unit is configured to generate air-blowing by nitrogen gas, and the suction unit sucks the oxidized residue.

10. The solder recovery device according to claim 1, wherein the agitation unit is positioned within the recycled solder in a lower portion of the melting crucible, and agitates the recycled solder.

11. The solder recovery device according to claim 1, wherein the first blower member is attached to an upped lid portion of the solder recovery device, and is positioned a specific distance above the upper surface of the melted solder dross.

12. The solder recovery device according to claim 1, wherein the second blower member is configured to move in a lateral direction such that the exit orifice of the second blower member scans a substantial portion of the upper surface of the oxidized residue, and the gas expelled from the exit orifice of the second blower member blows downward towards the substantial portion of the upper surface of the oxidized residue.

13. The solder recovery device according to claim 1, wherein one of said agitation unit and said suction unit is in operation while the other one of said agitation unit and said suction unit is not in operation, and
wherein when the agitation unit is in operation, the first blower member operates to blow the gas towards the upper surface of the melted solder dross, and when the suction unit is in operation, the second blower member operates to blow the gas towards the upper surface of the oxidized residue.

14. A solder recovery device, comprising:
a melter which melts solder dross stored in a melting crucible;
an agitation unit which agitates the melted solder dross, so as to separate the melted solder dross up and down into an oxidized residue and a recycled solder in the melting crucible,
said agitation unit including a first blower member configured to lower oxygen density in said solder recovery device by blowing a gas towards the melted solder dross while the agitation unit agitates the melted solder dross; and
a suction unit including a second blower member, the suction unit being configured to suction the oxidized residue generated by the agitation in an upper portion of the melting crucible while blowing up the oxidized residue with a gas expelled from the second blower member, wherein
the second blower member includes an exit orifice disposed above an upper surface of the oxidized residue of the melted solder dross, the second blower member being configured to move in a lateral direction such that the exit orifice of the second blower member scans a substantial portion of the upper surface of the oxidized residue, and the gas expelled from the exit orifice of the second blower member blows downward towards the substantial portion of the upper surface of the oxidized residue the suction unit further includes a lid member which opens and closes the opening of the melter.

15. The solder recovery device according to claim 14, wherein the gas from the second blower member contacts the oxidized residue and thereby causes the oxidized residue to move towards the suction unit.

16. The solder recovery device according to claim 14, wherein the exit orifice of the second blower member scans the substantial portion of the upper surface of the oxidized surface in a reciprocating or zig-zag movement.

17. A solder recovery device, comprising:
a melter which melts solder dross in a solder holding tray;
an agitation unit which agitates the melted solder dross, so as to separate the melted solder dross up and down into an oxidized residue and a recycled solder in the solder holding tray; and
a suction unit including a suction section disposed at a first side of the solder holding tray which sucks the oxidized residue generated by the agitation, the suction section sucking the oxidized residue to be removed in an upper portion of the solder holding tray,
said suction unit including a blower section having an exit orifice disposed at a second side of the solder holding tray opposite to the first side and above an upper surface of the oxidized residue of the melted solder dross, the blower section being configured to blow a gas towards the suction section along the upper surface of the oxidized residue in a direction parallel to the upper surface of the oxidized residue, wherein
a combination of the blowing applied by the blower section and the suction applied by the suction unit cause a spiral air current to be generated to lift the oxidized residue towards the suction section the suction unit further includes a lid member which opens and closes the opening of the melter.

* * * * *